United States Patent
Borlick et al.

(10) Patent No.: US 10,248,464 B2
(45) Date of Patent: Apr. 2, 2019

(54) PROVIDING ADDITIONAL MEMORY AND CACHE FOR THE EXECUTION OF CRITICAL TASKS BY FOLDING PROCESSING UNITS OF A PROCESSOR COMPLEX

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Trung N. Nguyen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/332,660

(22) Filed: Oct. 24, 2016

(65) Prior Publication Data

US 2018/0113744 A1    Apr. 26, 2018

(51) Int. Cl.
*G06F 9/50* (2006.01)
*G06F 12/08* (2016.01)
(Continued)

(52) U.S. Cl.
CPC .......... *G06F 9/5038* (2013.01); *G06F 9/5016* (2013.01); *G06F 9/526* (2013.01);
(Continued)

(58) Field of Classification Search
CPC ........ G06F 9/50; G06F 9/5016; G06F 9/5038; G06F 12/0806; G06F 12/084;
(Continued)

(56) References Cited

U.S. PATENT DOCUMENTS 6,085,215 A    7/2000    Ramakrishnan et al.
6,212,544 B1    4/2001    Borkenhagen et al.
(Continued)

FOREIGN PATENT DOCUMENTS

WO    WO2016023448    *    2/2016    ........... G06F 15/177

OTHER PUBLICATIONS

A. Tousimojarad, et al., "An Efficient Thread Mapping Strategy for Multiprogramming on Many core Processors", Parallel Computing: Accelerating Computational Science and Engineering (CSE), Advances in Parallel Computing 25, 2013, pp. 63-71.
(Continued)

*Primary Examiner* — Hal Schnee
(74) *Attorney, Agent, or Firm* — Rabindranath Dutta; Konrad Raynes Davda & Victor LLP

(57) ABSTRACT

A plurality of processing entities of a processor complex is maintained, wherein each processing entity has a local cache and the processor complex has a shared cache and a shared memory. One of the plurality of processing entities is allocated for execution of a critical task. In response to the allocating of one of the plurality of processing entities for the execution of the critical task, other processing entities of the plurality of processing entities are folded. The critical task utilizes the local cache of the other processing entities that are folded, the shared memory, and the shared cache, in addition to the local cache of the processing entity allocated for the execution of the critical task.

20 Claims, 9 Drawing Sheets

(51) Int. Cl.
*G06F 12/0811* (2016.01)
*G06F 12/084* (2016.01)
*G06F 12/0842* (2016.01)
*G06F 9/52* (2006.01)

(52) U.S. Cl.
CPC ........ *G06F 12/084* (2013.01); *G06F 12/0811* (2013.01); *G06F 12/0842* (2013.01); *G06F 2212/1021* (2013.01); *G06F 2212/1024* (2013.01); *G06F 2212/151* (2013.01); *G06F 2212/152* (2013.01); *G06F 2212/502* (2013.01); *G06F 2212/6042* (2013.01)

(58) Field of Classification Search
CPC ............. G06F 12/0842; G06F 12/0897; G06F 2212/1028; G06F 2212/6042
See application file for complete search history.

(56) References Cited

U.S. PATENT DOCUMENTS

| | | | |
|---|---|---|---|
| 6,681,293 | B1 | 1/2004 | Solomon et al. |
| 6,757,897 | B1 | 6/2004 | Shi et al. |
| 8,250,347 | B2 | 8/2012 | Kra |
| 8,276,142 | B2 | 9/2012 | Alameldeen et al. |
| 8,392,661 | B1 | 3/2013 | Metcalf |
| 9,639,401 | B1 | 5/2017 | Bertram et al. |
| 2002/0184445 | A1* | 12/2002 | Cherabuddi .......... G06F 12/084 711/130 |
| 2004/0030842 | A1 | 2/2004 | Cypher |
| 2004/0059875 | A1* | 3/2004 | Garg .................. G06F 12/0806 711/141 |
| 2005/0015768 | A1 | 1/2005 | Moore |
| 2009/0216950 | A1 | 8/2009 | McCalpin et al. |
| 2010/0185882 | A1 | 7/2010 | Arnold et al. |
| 2010/0223618 | A1 | 9/2010 | Fu et al. |
| 2010/0312823 | A1 | 12/2010 | Titus |
| 2011/0072212 | A1 | 3/2011 | Kojima |
| 2012/0054760 | A1 | 3/2012 | Chung |
| 2012/0079491 | A1 | 3/2012 | Chung |
| 2012/0198461 | A1 | 8/2012 | Saxe et al. |
| 2013/0042070 | A1 | 2/2013 | Jalal et al. |
| 2013/0227127 | A1 | 8/2013 | Takano et al. |
| 2013/0304992 | A1* | 11/2013 | Lee .................... G06F 12/0811 711/122 |
| 2013/0311722 | A1 | 11/2013 | Arelakis et al. |
| 2014/0059262 | A1* | 2/2014 | Davis .................. G06F 9/4812 710/269 |
| 2015/0277988 | A1* | 10/2015 | Watanabe ............. G06F 1/3203 718/104 |
| 2016/0203083 | A1* | 7/2016 | Park ................... G06F 12/0806 711/122 |
| 2016/0283380 | A1 | 9/2016 | Vinod et al. |
| 2016/0350159 | A1 | 12/2016 | Mealey et al. |
| 2017/0083334 | A1* | 3/2017 | Burger .................. G06F 9/3004 |
| 2017/0102971 | A1 | 4/2017 | Blagodurov |
| 2017/0279703 | A1 | 9/2017 | Wasmundt et al. |
| 2017/0300427 | A1* | 10/2017 | Lin ....................... G06F 12/128 |
| 2018/0046506 | A1 | 2/2018 | Borlick et al. |
| 2018/0046507 | A1 | 2/2018 | Borlick et al. |
| 2018/0113737 | A1 | 4/2018 | Borlick et al. |

OTHER PUBLICATIONS

U.S. Appl. No. 15/233,276, filed Aug. 10, 2016.
U.S. Appl. No. 15/233,295, filed Aug. 10, 2016.
U.S. Appl. No. 15/332,413, filed Oct. 24, 2016.
List of Patents or Patent Applications Treated as Related, dated Oct. 24, 2016, pp. 2.
Office Action dated Mar. 9, 2018, pp. 30, for U.S. Appl. No. 15/233,276, filed Aug. 10, 2016.
Office Action dated Jan. 12, 2018, pp. 23, for U.S. Appl. No. 15/233,295, filed Aug. 10, 2016.
Response to Office Action 1 for U.S. Appl. No. 15/233,295, dated Apr. 12, 2018, 14 pp.
Response dated Jun. 11, 2018, pp. 17, to Office Action dated Mar. 9, 2018, pp. 30, for U.S. Appl. No. 15/233,276, filed Aug. 10, 2016.
Final Office Action dated Jul. 11, 2018, pp. 31, for U.S. Appl. No. 15/233,295, filed Aug. 10, 2016.
Notice of Allowance dated Aug. 28, 2018, pp. 19, for U.S. Appl. No. 15/233,276, filed.
Yun, et al. ,"Memory Access Control in Multipocessor for Real-time Systems with Mixed Criticality", [online] 2012, pp. 1-10, Retrieved from the internet <https://scholar.google.com/scholar?output=instlink&q=info:OV8W3Gg33mkJ:schlar.google.com/&hll=en&as_sdt=0,47&scillfp=17545817565657558581&oi=11e>.
Augonnet, et al., "StarPU: A Unified Platform for Task Scheduling on Heterogenous Multicore Architectures" [online] Springer., pp. 1-13, Retrieved from the internet <https://hal.inria.fr/inria-00384363/document>.
Notice of Allowance dated Oct. 11, 2018, pp. 47, for U.S. Appl. No. 15/332,413.
Augonnet, et al., "StarPU: A Unified Platform for Task Scheduling on Heterogenous Multicore Architectures" [online] Springer., May 2009, pp. 1-13, Retrieved from the internet <https://hal.inria.fr/inria-00384363/document>.
Response dated Oct. 11, 2018, pp. 17, to Final Office Action dated Jul. 11, 2018, pp. 31, for U.S. Appl. No. 15/233,295.
Notice of Allowance dated Dec. 19, 2018, pp. 32, for U.S. Appl. No. 15/233,295.
Notice of Allowance dated Nov. 16, 2018, pp. 15, for U.S. Appl. No. 15/233,276, filed.
U.S. Appl. No. 16/211,996, filed Dec. 6, 2018.
List of IBM Patents or Patent Applications Treated as Related, dated Jan. 9, 2019, pp. 2.

* cited by examiner

PROVIDING ADDITIONAL MEMORY AND CACHE FOR THE EXECUTION OF CRITICAL TASKS BY FOLDING PROCESSING UNITS OF A PROCESSOR COMPLEX

BACKGROUND

1. Field

Embodiments relate to the providing of additional memory and cache for the execution of critical tasks by folding processing units of a processor complex.

2. Background

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A host may send Input/Output (I/O) commands to the storage system and the storage system may execute the I/O commands to read data from the storage devices or write data to the storage devices.

The storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores (also referred to as cores) and the servers may share the workload of the storage system. In a two server configuration of the storage system, either server can failover to the other if there is a failure or a planned downtime for one of the two servers. For example, a first server may failover to a second server, if there is a failure of the first server.

A computational device, such as a host or a server of a storage system, may include a plurality of processors and form a multiprocessing system. A computational device may have a processor complex that may have a single core or a plurality of cores, where a core may correspond to a central processing unit (CPU). For example, a dual-core processor complex has two central processing units, so that the dual-core processor complex may appear to the operating system as two CPUs.

A process (or task) is an instance of a computer program that is being executed. Depending on the operating system, a process may be made up of multiple threads of execution that execute instructions concurrently. Multiple threads may exist within the same process and share resources such as memory. A thread is what the CPU actually runs, whereas a process has the allocated memory for instructions and data. A process may need one or more threads because that is what is actually run by the CPU. Multiple threads corresponding to a process implies that the process gets more time slices on the same CPU or gets to run on more CPUs concurrently. A process needs at least one thread that the CPU executes. In a multi-core processor complex, a different process may use a different core at the same time to speed up the system.

U.S. Pat. No. 8,276,142 describes a method that includes scheduling a thread to run on a core of a multi-core processor. U.S. Pat. No. 8,250,347 describes asymmetric hardware support for a special class of threads. US Patent Publication 2005/0015768 describes a method for scheduling tasks. U.S. Pat. No. 6,212,544 describes a method for performing computer processing operations in a data processing system having a multithreaded processor and thread switch logic. U.S. Pat. No. 6,085,215 describes a method using a combination of processing threads, polling, and a use of interrupts to allocate the use of processing resources fairly among competing functions.

A processor intensive task is any task that is speed limited by how fast the processor can compute the data. A memory intensive task is any task that is speed limited by how fast the memory can feed data to the processor. Some tasks may be memory intensive tasks whereas other tasks may be a processor intensive task. Additionally, certain tasks may be suitable for parallelization whereas other tasks may not be suitable for parallelization.

SUMMARY OF THE PREFERRED EMBODIMENTS

Provided are a method, a system, and a computer program product in which a plurality of processing entities of a processor complex is maintained, wherein each processing entity has a local cache and the processor complex has a shared cache and a shared memory. One of the plurality of processing entities is allocated for execution of a critical task. In response to the allocating of one of the plurality of processing entities for the execution of the critical task, other processing entities of the plurality of processing entities are folded. The critical task utilizes the local cache of the other processing entities that are folded, the shared memory, and the shared cache, in addition to the local cache of the processing entity allocated for the execution of the critical task. As a result, the execution of critical tasks are speeded up by increasing the hit ratio for reads and writes.

In further embodiments, additional resources that are freed by folding the other processing entities are also utilized by the critical task, wherein folding of the other processing entities comprises stopping processing operations in the other processing entities, and releasing the local cache of the other processing entities for use by the processing entity allocated for execution of the critical task. As a result, the local cache of the other processing entities increase the memory available for caching to the critical task.

In yet further embodiments, prior to folding the other processing entities, currently scheduled tasks on the other processing entities are temporarily suspended. As a result, non-critical tasks that have lower priority than critical tasks may receive lower priority.

In certain embodiments, in response to completion of the critical task in the processing entity that is determined, an unfolding of the other processing entities is performed to make the other processing entities operational. In response to performing the unfolding of the other processing entities, any suspended tasks are resumed and queued tasks are dispatched. As a result, non-critical tasks are executed after completion of execution of the critical task.

In additional embodiments, it is preferable to execute the critical task on a single processing entity in comparison to more than one processing entity. As a result, the critical task is executed sequentially when the critical task cannot be parallelized.

In yet additional embodiments, the plurality of processing entities comprises a plurality of cores of a chip, wherein the local cache comprises an L1 and an L2 cache, and the shared cache comprises an L3 cache of the chip. As a result, certain embodiments are implemented in hardware based processing units.

In further embodiments, the plurality of processing entities comprises a plurality of virtual processors implemented via software or firmware. As a result, certain embodiments are implemented via virtual processors.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A computational device, such has a server, may comprise a CPU complex (processor complex) that has many chips. A chip may have a plurality of cores that may simultaneously execute a plurality of threads. All the threads running in a core may share the same L1 and L2 cache. Additionally, the threads that run on the cores in a chip share an L3 cache (This may be somewhat different in some CPU architectures where the L3 cache is also shared within the same core instead of the chip). If data is not found in the L1 cache, then the date is retrieved from the L2 cache, and if the data is not found in the L3 cache then the data is retrieved from the L3 cache.

A server in a storage system may have certain tasks that are critical for ensuring a high performance storage system. A critical task that is not suitable for parallelization may be running on a single core of a multi-core computational device. When such a critical task is running on a core, the critical task may need cache hits (e.g. to the L1, L2, and L3 cache) to be high, and in certain embodiments may benefit from additional cache and memory.

In certain embodiments, to speed up the execution of such a critical task, additional cache and memory are allocated to a critical task that executes on a core of a chip, by proactively folding (i.e., making idle) the other cores of the chip. The folding of the other cores of the chip allows the local cache of the other cores of the chip to be used by the critical task. The shared cache and the shared memory of the chip may also be used by the critical task. As a result the memory and cache that may be utilized by the critical task is increased, and the execution of the critical task is faster in comparison to existing mechanisms.

Exemplary Embodiments

Figure 1:
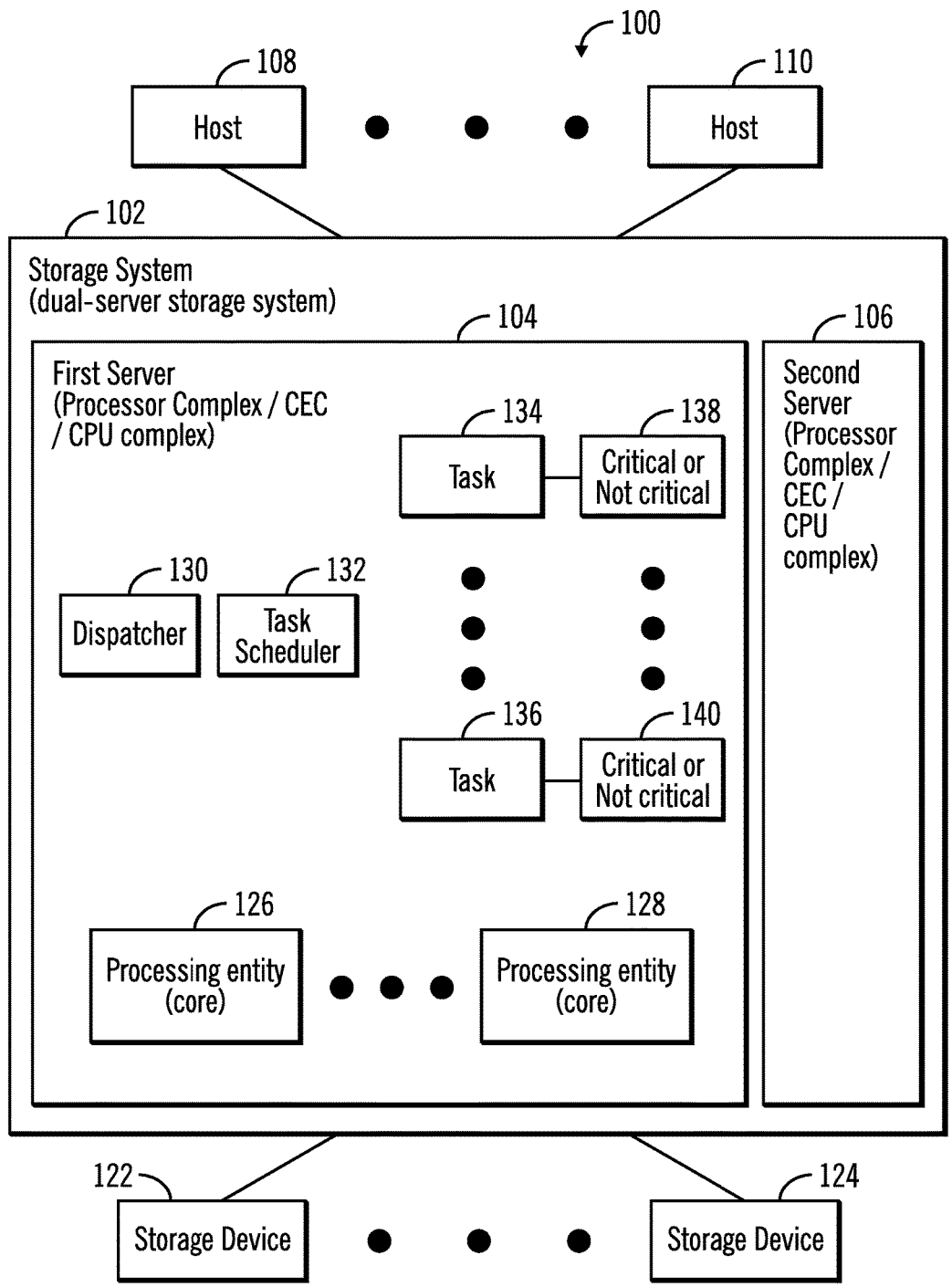
FIG. 1 illustrates a block diagram of a computing environment comprising a storage system comprising a first server and a second server that both comprise multi-core processor complexes in which a task scheduler is implemented for scheduling tasks on one or more cores, in accordance with certain embodiments.

FIG. 1 illustrates a block diagram of a computing environment 100 comprising a storage system 102 comprising a first server 104 and a second server 106, where the storage system 102 communicates with a plurality of hosts 108, 110 over a network and controls access to storage included in one or more storage devices 122, 124, in accordance with certain embodiments.

The storage system 102, the servers 104, 106 and the hosts 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of servers 104, 106 may provide redundancy because if one server undergoes a failure from which recovery is not possible, an alternate server may perform the functions of the server that failed. Each of the plurality of servers 104, 106 may be referred to as a processor complex, a central electronics complex (CEC), or a central processing unit (CPU) complex and may include one or more processors and/or processor cores. The storage system 102 may also be referred to as a dual-server storage system. While the servers 104 and 106 may be referred to as a processor complex, in certain embodiments the storage system 102 may be referred to as a processor complex.

The storage system 102, the servers 104, 106 and the hosts 108, 110 may be elements in any suitable network, such as, a storage area network, a wide area network, the Internet, an intranet. In certain embodiments, storage system 102, the servers 104, 106 and the hosts 108, 110 may be elements in a cloud computing environment.

It should be noted that the storage system 102 may be configured and accessed in many different ways. For example, virtualization may be performed to access the hardware elements of the storage system 102 (e.g., by generating virtual processing entities and allocating cache and memory for the generated virtual processing entities). Additionally, in certain embodiments, the storage system 102 may have a single server or may have more than two servers.

In certain embodiments, each of the servers 104, 106 may have corresponding applications and data structures implemented in each, and the applications and data structures implemented in the first server 104 are shown. The second server 106 may have similar applications and data structures, and may have similar hardware, firmware, and/or software.

The first server 104 includes a plurality of processing entities 126, 128, where in certain embodiments each processing entity is a central processing unit (CPU) such as a core. In certain embodiments, each processing entity 126, 128 is the lowest granularity of a processor that is configurable to execute a task.

Each server 104 may also include a dispatcher 130 and a task scheduler 132. The dispatcher 130 dispatches one or more tasks 134, 136 to the task scheduler 132 where the task scheduler 132 schedules one or more threads of a task for execution on a processing entity 126, 128. Each task 134, 136 may be a critical or a non-critical task as shown via reference numerals 138, 140. A critical task is a task that is desirable to execute ahead of a non-critical task in a fast manner. For example, in the server 104, when a device adapter indicates completion of stage and destage requests with respect to a cache, the completions may be critical tasks that may need to be processed in a fast manner over other tasks. The critical tasks may be referred to as dedicated tasks and are dispatched by the task scheduler 132 for preferential execution on cores while at the same time an attempt is made to provide exclusive access to the cache on the cores to the dedicated tasks.

Figure 2:
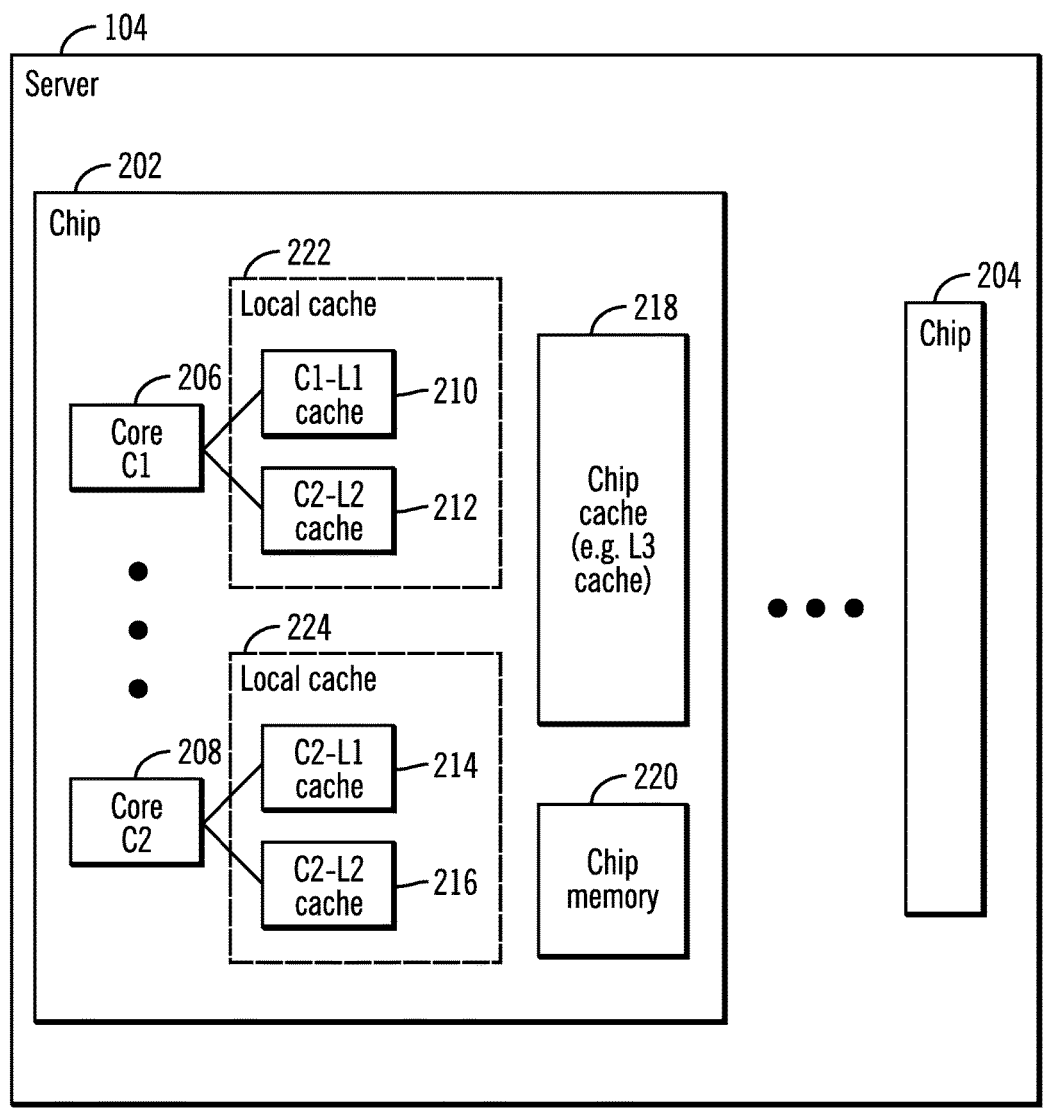
FIG. 2 illustrates a block diagram of a server that comprises a processor complex, in accordance with certain embodiments

FIG. 2 illustrates a block diagram of the server 104 that comprises a processor complex or a central electronics complex (CEC), in accordance with certain embodiments. The server 104 may be comprised of a plurality of chips 202, 204 where each chip is comprised of a plurality of cores 206, 208, wherein core C1 is shown via reference numeral 206 and core C2 is shown via reference numeral 208. Each core may have a L1 cache and a L2 cache (shown via reference numerals 210, 212, 214, 216) that are shared by threads that execute in the core, and each chip 202 may have an L3 cache 218 that is a type of chip cache, where the L3 cache is shared among threads that execute in one or more cores 206, 208 of the chip 202. Each of the chips may also have a chip memory 220 for executing operations in the chip.

In FIG. 2, the L1 and L2 cache coupled to core C1 206 are referred to as C1-L1 cache (shown via reference numeral 210), and C1-L2 cache (shown via reference numeral 212) respectively, and are collectively referred to as local cache 222. The L1 and L2 cache coupled to core C2 208 are referred to as C2-L1 cache (shown via reference numeral 214), and C2-L2 cache (shown via reference numeral 216) respectively, and are collectively referred to as local cache 224.

In certain embodiments, each core 206, 208 corresponds to a processing entity 126, 128 shown in FIG. 1. In other embodiments, each chip 202, 204 corresponds to a processing entity 126, 128 shown in FIG. 1. Other arrangements of L1 cache, L2 cache, and L3 cache may be found in the server 104.

Figure 3:
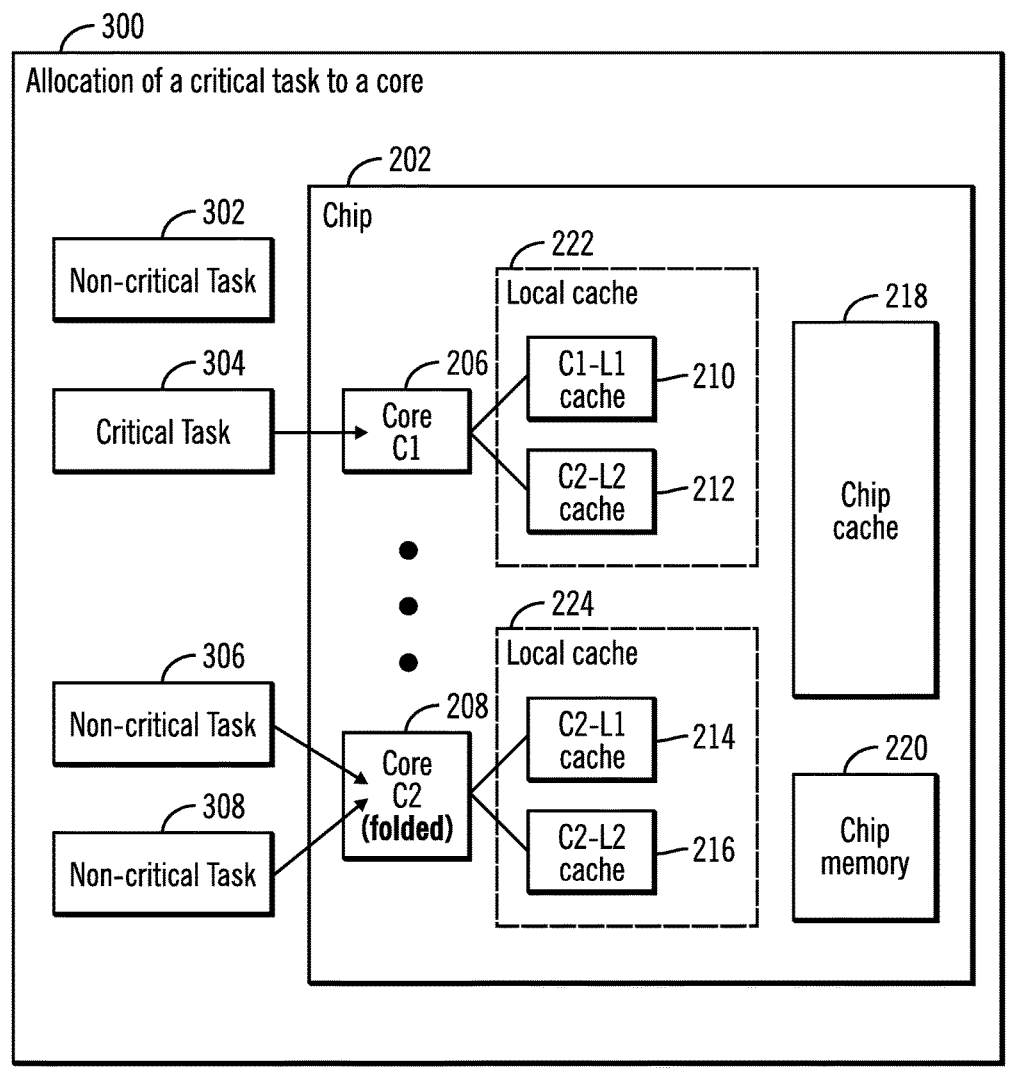
FIG. 3 illustrates a block diagram that shows an allocation of a critical task to a core, in accordance with certain embodiments.

FIG. 3 illustrates a block diagram 300 that shows an allocation of a critical task to a core, in accordance with certain embodiments. The allocation may be performed by the scheduler 132 that executes in the server 104.

FIG. 3 shows four tasks 302, 304, 306, 308. Of the four tasks, three are non-critical tasks (shown via reference numerals 302, 306, 308) and one is a critical task (shown via reference numeral 304).

At a certain point in time, the non-critical tasks 306, 308 are running on core C2 208, when the critical task 304 is scheduled by the scheduler 132 for execution on core C1 206. In certain embodiments, core C2 208 is folded (i.e., made non-operational, e.g., by shutting off power) and the cache C2-L1 214 and cache C2-L2 216 are allowed to be used by the critical task 304 that is executing in core C1. Therefore, the critical task 304 can now use the local cache 224 of core C2 208 (folded core), in addition to using the local cache 222 of core C1 206, and the chip cache 218 and the chip memory 220. As a result, the critical task 304 has a better hit ratio on reads and writes.

Figure 4:
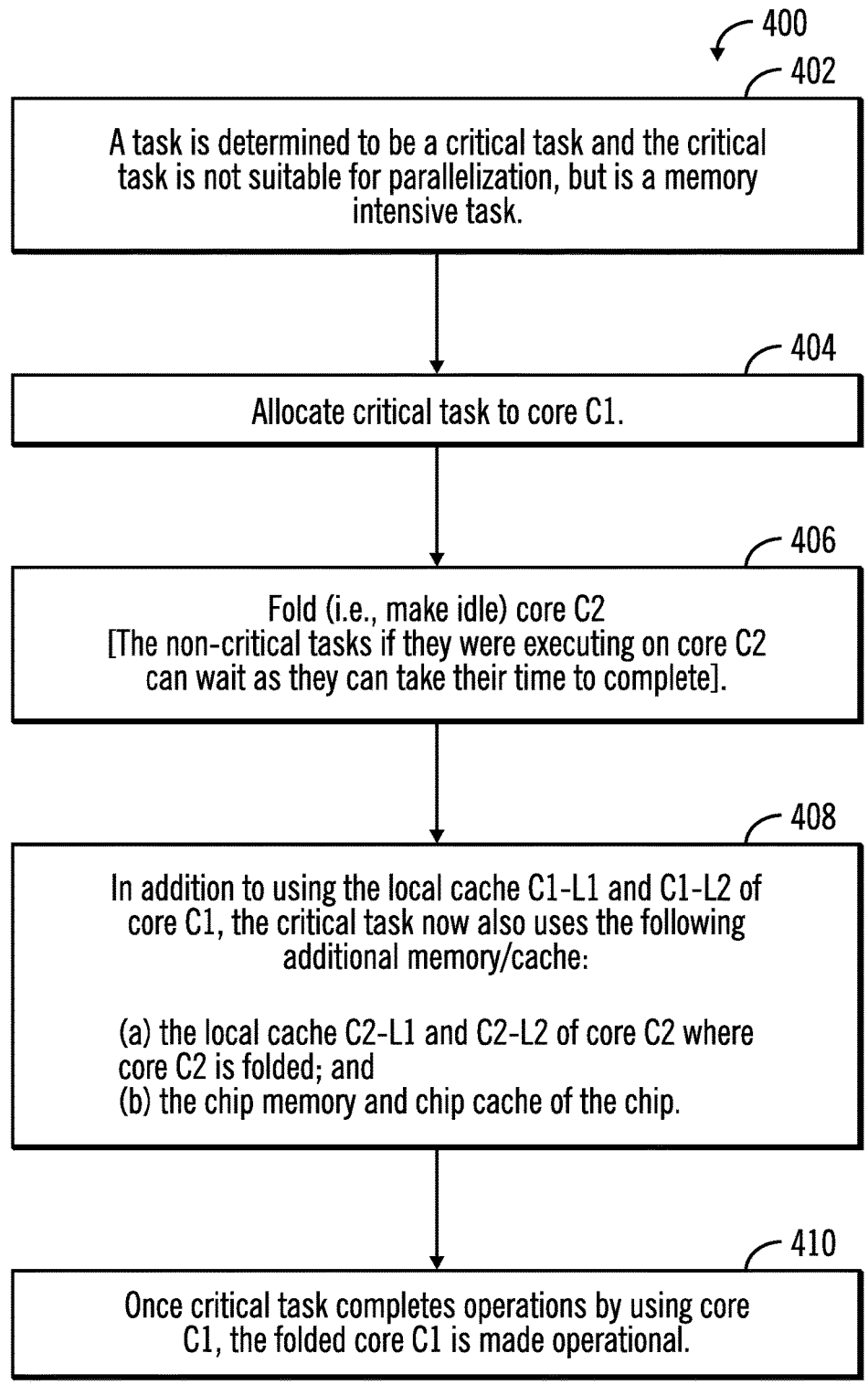
FIG. 4 illustrates a first flowchart that shows how additional memory and cache are provided for the execution of critical tasks by folding cores of a chip, in accordance with certain embodiments.

FIG. 4 illustrates a first flowchart 400 that shows how additional memory and cache are provided for the execution of critical tasks by folding cores of a chip 202, in accordance with certain embodiments. The operations shown in FIG. 4 may be performed by the scheduler 132 that executes may execute in server 104, 106 or the storage system 102. While the operations are shown by using two cores 206, 208, in other embodiments more than two cores may be used.

Control starts at block 402 in which a task is determined to be a critical task 304. The critical task 304 is not suitable for parallelization, and may be a memory intensive task. The critical task 304 is allocated (at block 404) to core C1 206 for execution. Control proceeds to block 406 in which the scheduler 132 folds (i.e., make idle) core C2 208 (and potentially other cores of the chip 202). The non-critical tasks 306, 308 if they were executing on core C2 208 can wait, as the non-critical tasks can complete after completion of the critical task.

Control proceeds to block 408 in which in addition to using the local cache 222 comprising the C1-L1 cache 210 and the cache C1-L2 212 of core C1 206, the critical task 304 now also uses the following additional memory/cache:

(a) the local cache 224 comprising cache C2-L1 214 and cache C2-L2 216 of core C2 208, where core C2 208 is folded; and (b) the chip memory 220 and chip cache 218 of the chip 202.

Therefore, FIG. 4 illustrates certain embodiments in which the critical task 304 not only uses the local cache 222 of the processing entity 206 (core 206) it executes on, but also uses the local cache 224 of one or more other processing entities 208 (core 208) that are folded, in addition to the chip cache 218 and the chip memory 220.

Figure 5:
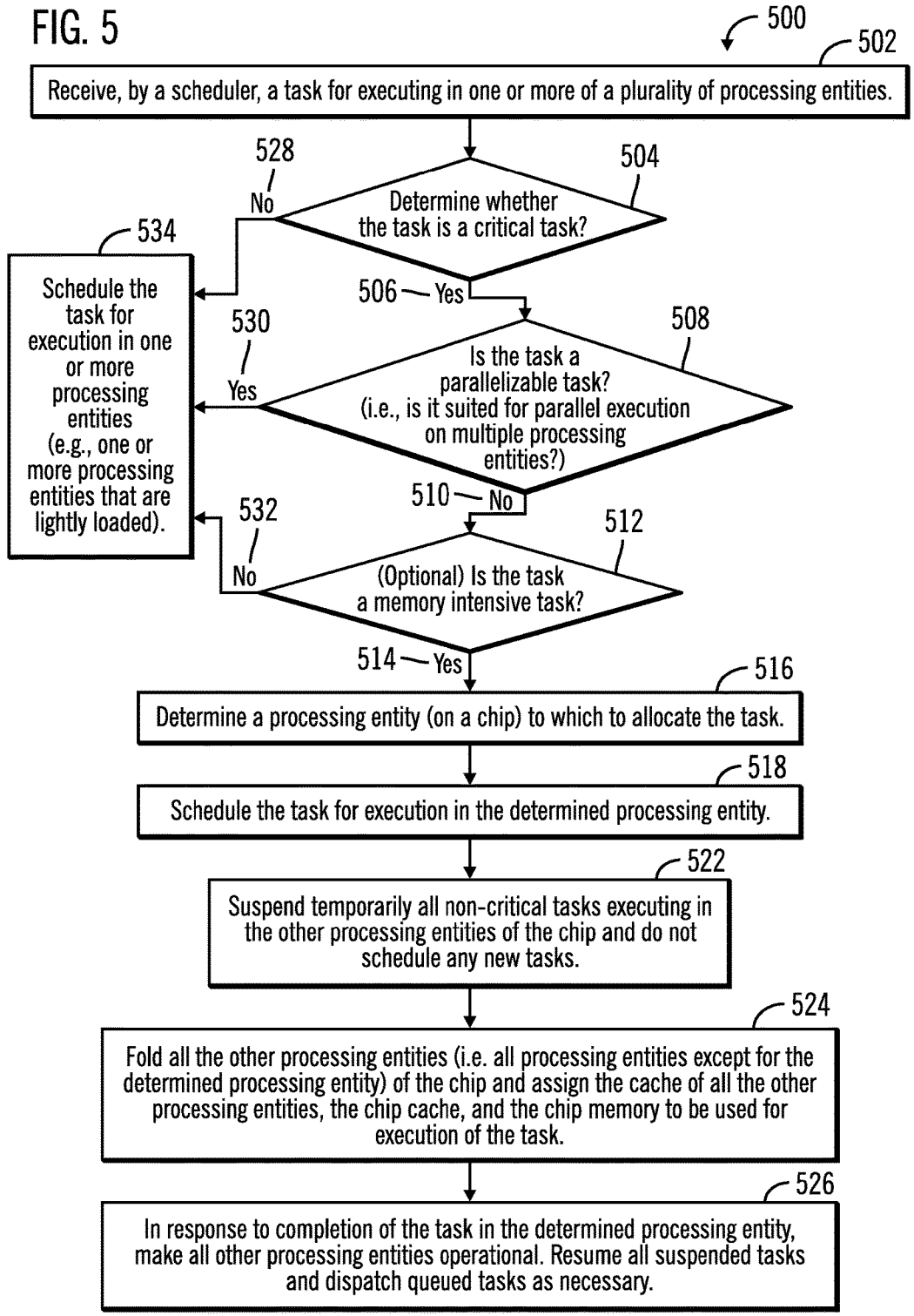
FIG. 5 illustrates a second flowchart that shows how additional memory and cache are provided for the execution of critical tasks by folding processing entities, in accordance with certain embodiments.

FIG. 5 illustrates a second flowchart 500 that shows how additional memory and cache are provided for the execution of critical tasks by folding processing entities of a chip, in accordance with certain embodiments. The operations shown in FIG. 5 may be performed by the scheduler 132 that executes may execute in server 104, 106 or the storage system 102.

Control starts at block 502 in which a scheduler 132 receives a task for executing in one or more of a plurality of processing units. The scheduler 132 determines (at block 504) whether the task is a critical task. If so ("Yes" branch 506) control proceeds to block 508 in which the scheduler 132 determines whether the task is a parallelizable task, i.e., a task that is suitable for parallel execution on multiple processing entities.

If at block 508, the scheduler 132 determines that the task is not a parallelizable task ("No" branch 510) then control proceeds to block 512 in which in certain embodiments it is optionally determined whether the task is a memory intensive task. If so ("Yes" branch 514) control proceeds to block 516, where the scheduler 132 determines a processing entity (on a chip) to which to allocate the task, and schedules (at block 518) the task for execution on the determined processing entity. For example, the scheduler 132 may schedule the task for execution on processing entity 206.

In response to scheduling the task for executing on a processing entity, control proceeds to block 522 in which all non-critical tasks that are executing in the other processing entities of the chip are temporarily suspended, and new tasks are prevented from being scheduled.

From block 522 control proceeds to block 524 in which the scheduler 132 folds all the other processing entities (i.e. all processing entities 208 except for the determined processing entity 206) of the chip 202 and assigns the cache 224 of all the other processing entities 208, the chip cache 218 and the chip memory 220 to be used for execution of the task. In response to completion of the task in the determined processing entity, all other processing entities are made operational (at block 526) and all suspended tasks are resumed and queued tasks are dispatched for processing.

"No" branches 528, 532 from blocks 504, 512 and "Yes" branch 530 from block 508 takes the control to block 534 in which the scheduler 132 schedules the task for execution in one or more processing entities of the chip without folding any processing entity. For example, one or more processors that are least lightly loaded may be used for processing the task.

Therefore, FIG. 5 illustrates certain embodiments for allocating the local cache of folded processing entities for use by a critical task that runs on a single processing entity that is not a folded processing entity.

Figure 6:
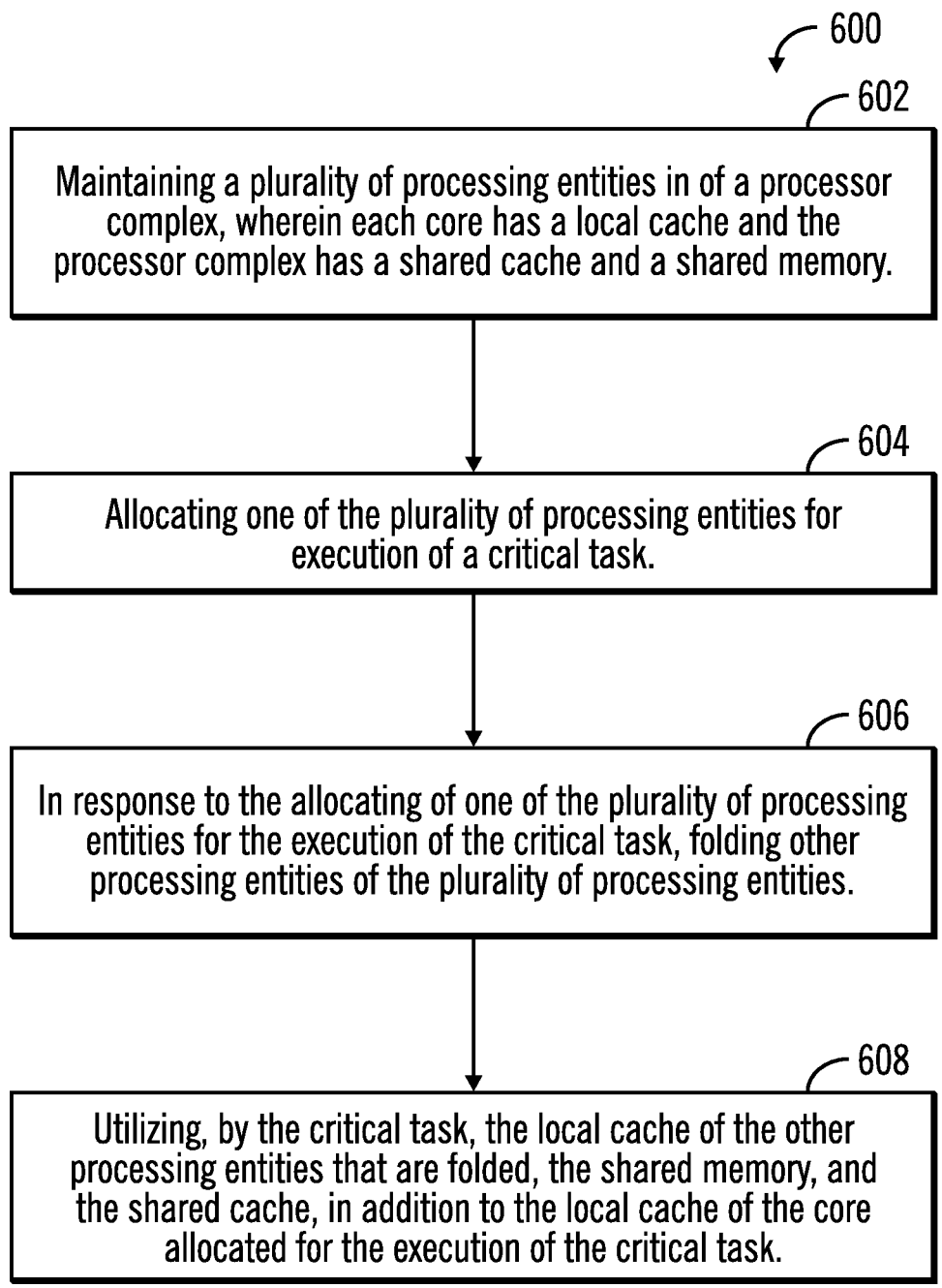
FIG. 6 illustrates a third flowchart that shows how additional memory and cache are provided for the execution of critical tasks by folding processing entities, in accordance with certain embodiments.

FIG. 6 illustrates a third flowchart 600 that shows how additional memory and cache are provided for the execution of critical tasks by folding processing entities, in accordance with certain embodiments. The operations shown in FIG. 6 may be performed by the scheduler 132 that executes may execute in server 104, 106 or the storage system 102.

Control starts at block 602 in which a plurality of processing entities 126, 128 of a processor complex 104 is maintained (i.e., kept operational), wherein each processing entity has a local cache 222, 224 and the processor complex 104 has a shared cache 218 and a shared memory 220. One of the plurality of processing entities is allocated (at block 604) for execution of a critical task. For example, in certain embodiments core C1 206 may be allocated for execution of a critical task.

In response to the allocating of one of the plurality of processing entities for the execution of the critical task, other processing entities of the plurality of processing entities are folded (as shown in block 606). For example, in certain embodiments, core C2 208 and other cores except for core C1 206 are all folded.

From block 606 control proceeds to block 608 in which the critical task 304 utilizes the local cache 224 of the other processing entities that are folded, the shared memory 220, and the shared cache 218, in addition to the local cache 222 of the processing entity allocated for the execution of the critical task 304.

In some embodiments, when an operational processor is folded then other resources (besides the shared memory 220 and shared cache 218) that were being used by the operational processor are also made available to the critical task. These other resources may include items whose usage by non-critical tasks may cause contention or delay in the operations of the critical task, such as, disk, flash memory, internal network operations (e.g. peer to peer remote copy, host connectively), external network operations (e.g., Internet connectively), etc.

Therefore, FIGS. 1-6 illustrate certain embodiments in which processing entities such as cores are folded to provide additional cache for execution of a critical task. In some embodiments, the additional cache that is provided comprises an L1 and an L2 cache of the folded core. In certain embodiments, the processing entities are not physical cores but comprise a plurality of virtual processors implemented via software or firmware.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
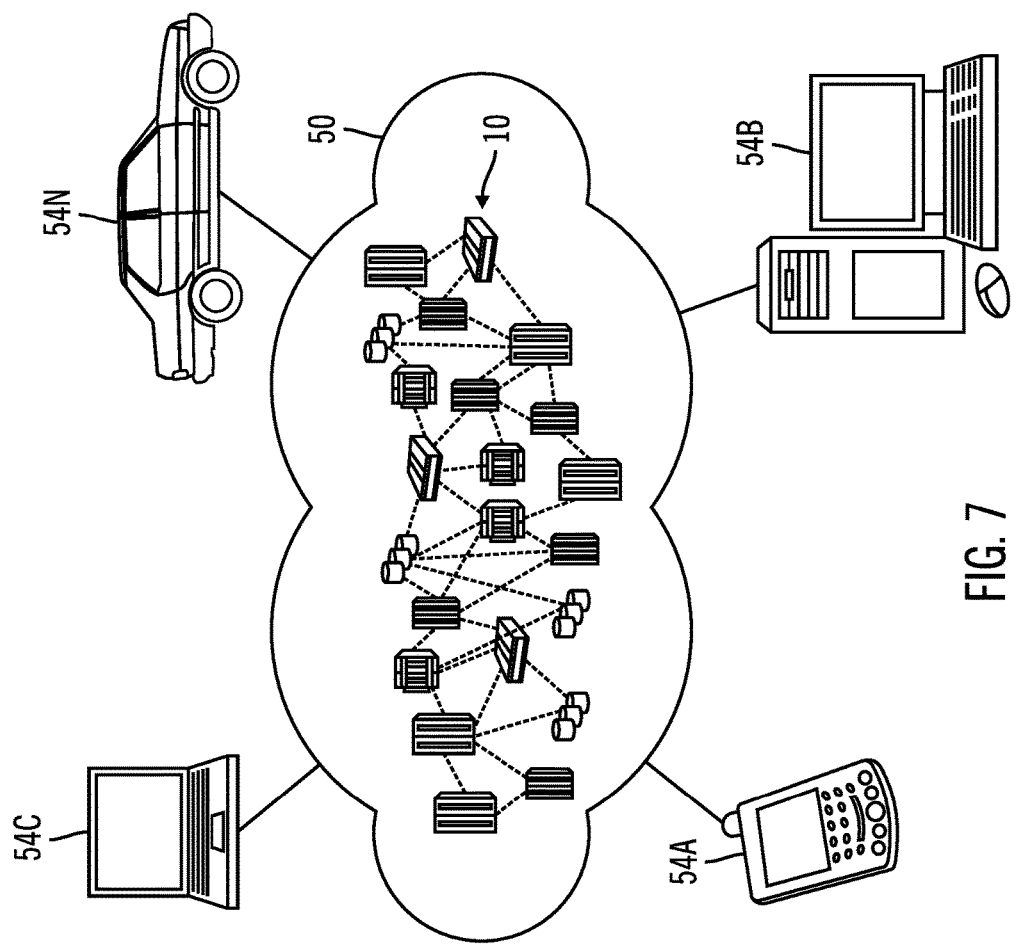
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
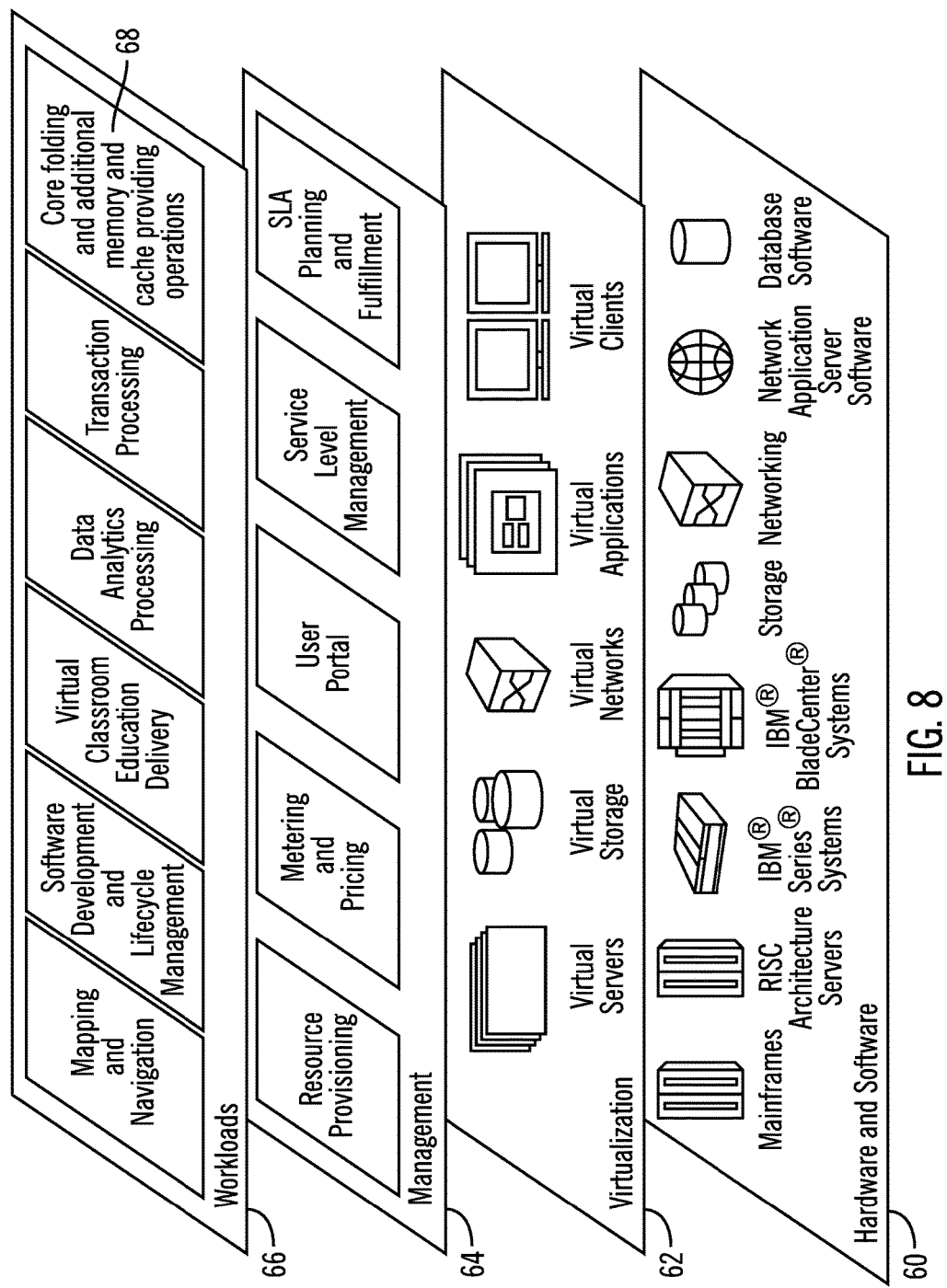
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems;

storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the core folding and additional memory and cache providing operations 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
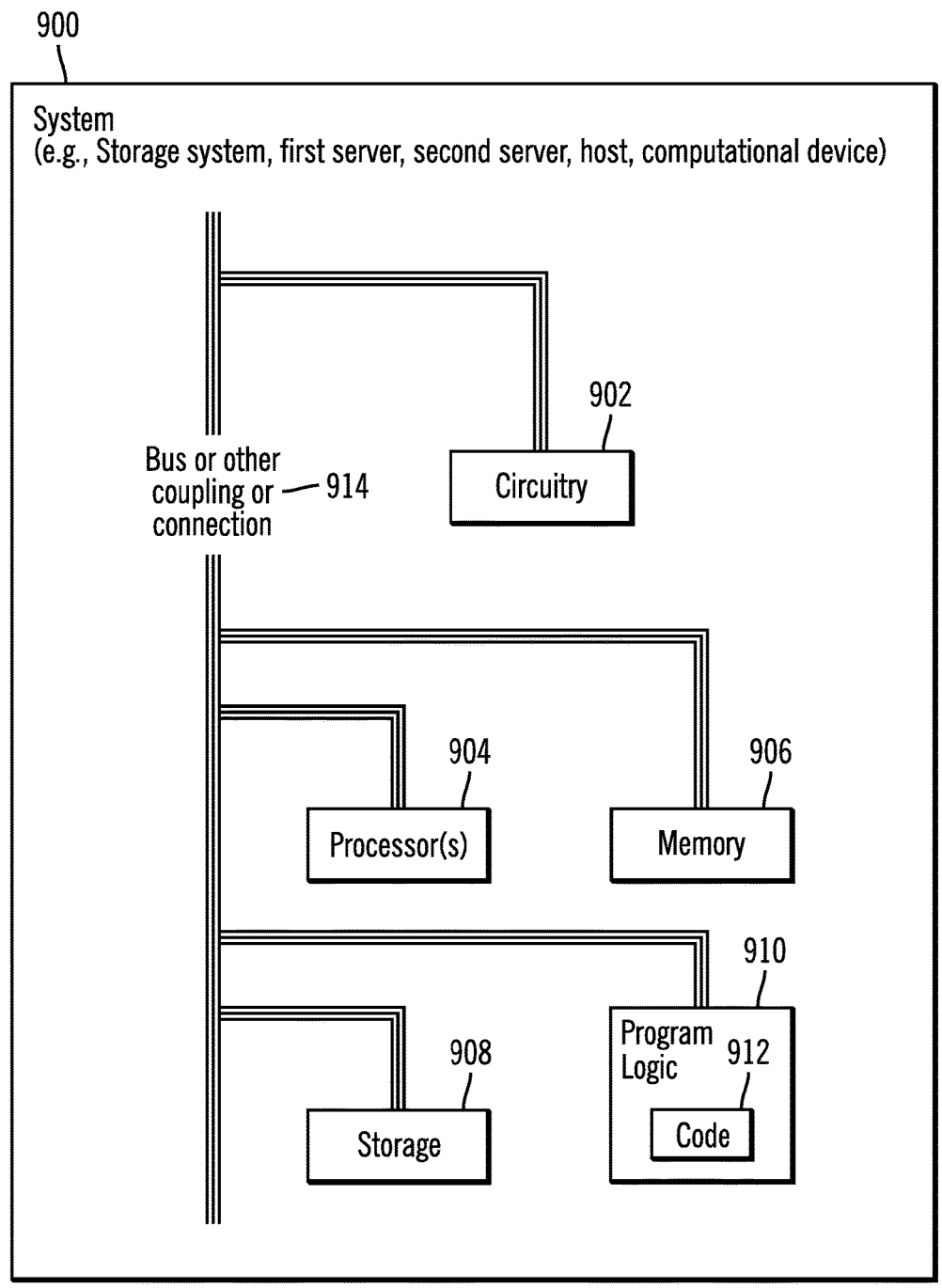
FIG. 9 illustrates a block diagram of a computational system that shows certain elements that may be included in the storage system, servers, and/or the host(s), as described in FIG. 1 and FIG. 2 in accordance with certain embodiments.

FIG. 9 illustrates a block diagram that shows certain elements that may be included in the storage system 102, the first server 104, the second server 106, the hosts 108, 110 or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    maintaining a plurality of processing entities of a processor complex, wherein each processing entity has a local cache and the processor complex has a shared cache and a shared memory;
    allocating one of the plurality of processing entities for execution of a critical task;
    in response to the allocating of one of the plurality of processing entities for the execution of the critical task, folding other processing entities of the plurality of processing entities by stopping processing operations in the other processing entities and releasing the local cache of the other processing entities for use by the processing entity allocated for execution of the critical task, wherein prior to folding the other processing entities, currently scheduled tasks on the other processing entities are temporarily suspended;

utilizing, by the critical task, the local cache of the other processing entities that are folded, the shared memory, additional resources that are freed by folding the other processing entities, and the shared cache, in addition to the local cache of the processing entity allocated for the execution of the critical task;

in response to completion of the critical task in the processing entity that is allocated, performing an unfolding of the other processing entities to make the other processing entities operational; and in response to performing the unfolding of the other processing entities, resuming any suspended tasks and dispatch queued tasks.

2. The method of claim 1, wherein it is preferable to execute the critical task on a single processing entity in comparison to more than one processing entity.

3. The method of claim 1, wherein the plurality of processing entities comprises a plurality of cores of a chip, wherein the local cache comprises an L1 and an L2 cache, and the shared cache comprises an L3 cache of the chip.

4. The method of claim 1, wherein the plurality of processing entities comprises a plurality of virtual processors implemented via software or firmware.

5. A system, comprising:
a processor;
a computer readable storage medium having program instructions embodied therewith, the program instructions executable by the processor to cause the processor to perform operations, the operations comprising:
maintaining a plurality of processing entities, wherein each processing entity has a local cache;
allocating one of the plurality of processing entities for execution of a critical task;
in response to the allocating of one of the plurality of processing entities for the execution of the critical task, folding other processing entities of the plurality of processing entities by stopping processing operations in the other processing entities and releasing the local cache of the other processing entities for use by the processing entity allocated for execution of the critical task, wherein prior to folding the other processing entities, currently scheduled tasks on the other processing entities are temporarily suspended;
utilizing, by the critical task, the local cache of the other processing entities that are folded, a shared memory, additional resources that are freed by folding the other processing entities, and a shared cache, in addition to the local cache of the processing entity allocated for the execution of the critical task;
in response to completion of the critical task in the processing entity that is allocated, performing an unfolding of the other processing entities to make the other processing entities operational; and
in response to performing the unfolding of the other processing entities, resuming any suspended tasks and dispatch queued tasks.

6. The system of claim 5, wherein it is preferable to execute the critical task on a single processing entity in comparison to more than one processing entity.

7. The system of claim 5, wherein the plurality of processing entities comprises a plurality of cores of a chip, wherein the local cache comprises an L1 and an L2 cache, and the shared cache comprises an L3 cache of the chip.

8. The system of claim 5, wherein the plurality of processing entities comprises a plurality of virtual processors implemented via software or firmware.

9. A computer program product, the computer program product comprising a computer readable storage medium having program instructions embodied therewith, the program instructions executable to perform operations, the operations comprising:
maintaining a plurality of processing entities of a processor complex, wherein each processing entity has a local cache and the processor complex has a shared cache and a shared memory;
allocating one of the plurality of processing entities for execution of a critical task;
in response to the allocating of one of the plurality of processing entities for the execution of the critical task, folding other processing entities of the plurality of processing entities by stopping processing operations in the other processing entities and releasing the local cache of the other processing entities for use by the processing entity allocated for execution of the critical task, wherein prior to folding the other processing entities, currently scheduled tasks on the other processing entities are temporarily suspended;
utilizing, by the critical task, the local cache of the other processing entities that are folded, a shared memory, additional resources that are freed by folding the other processing entities, and the shared cache, in addition to the local cache of the processing entity allocated for the execution of the critical task;
in response to completion of the critical task in the processing entity that is allocated, performing an unfolding of the other processing entities to make the other processing entities operational; and
in response to performing the unfolding of the other processing entities, resuming any suspended tasks and dispatch queued tasks.

10. The computer program product of claim 9, wherein it is preferable to execute the critical task on a single processing entity in comparison to more than one processing entity.

11. The computer program product of claim 9, wherein the plurality of processing entities comprises a plurality of cores of a chip, wherein the local cache comprises an L1 and an L2 cache, and the shared cache comprises an L3 cache of the chip.

12. The computer program product of claim 9, wherein the plurality of processing entities comprises a plurality of virtual processors implemented via software or firmware.

13. A storage system, comprising:
a first server; and
a second server coupled to the first server, wherein the storage system is configurable to perform operations, the operations comprising:
maintaining a plurality of processing entities, wherein each processing entity has a local cache;
allocating one of the plurality of processing entities for execution of a critical task;
in response to the allocating of one of the plurality of processing entities for the execution of the critical task, folding other processing entities of the plurality of processing entities by stopping processing operations in the other processing entities and releasing the local cache of the other processing entities for use by the processing entity allocated for execution of the critical task, wherein prior to folding the other processing entities, currently scheduled tasks on the other processing entities are temporarily suspended;

utilizing, by the critical task, the local cache of the other processing entities that are folded, a shared memory, additional resources that are freed by folding the other processing entities, and a shared cache, in addition to the local cache of the processing entity allocated for the execution of the critical task;

in response to completion of the critical task in the processing entity that is allocated, performing an unfolding of the other processing entities to make the other processing entities operational; and in response to performing the unfolding of the other processing entities, resuming any suspended tasks and dispatch queued tasks.

14. The storage system of claim 13, wherein it is preferable to execute the critical task on a single processing entity in comparison to more than one processing entity.

15. The storage system of claim 13 wherein the plurality of processing entities comprises a plurality of cores of a chip, wherein the local cache comprises an L1 and an L2 cache, and the shared cache comprises an L3 cache of the chip.

16. The storage system of claim 13, wherein the plurality of processing entities comprises a plurality of virtual processors implemented via software or firmware.

17. A server computational device of a dual-server storage system, the server computational device comprising:

a processor; and a computer readable storage medium having program instructions embodied therewith, the program instructions executable by the processor to cause the processor to perform operations, the operations comprising:

maintaining a plurality of processing entities, wherein each processing entity has a local cache;

allocating one of the plurality of processing entities for execution of a critical task;

in response to the allocating of one of the plurality of processing entities for the execution of the critical task, folding other processing entities of the plurality of processing entities by stopping processing operations in the other processing entities and releasing the local cache of the other processing entities for use by the processing entity allocated for execution of the critical task, wherein prior to folding the other processing entities, currently scheduled tasks on the other processing entities are temporarily suspended;

utilizing, by the critical task, the local cache of the other processing entities that are folded, a shared memory, additional resources that are freed by folding the other processing entities, and a shared cache, in addition to the local cache of the processing entity allocated for the execution of the critical task;

in response to completion of the critical task in the processing entity that is allocated, performing an unfolding of the other processing entities to make the other processing entities operational; and in response to performing the unfolding of the other processing entities, resuming any suspended tasks and dispatch queued tasks.

18. The server computational device of claim 17, wherein it is preferable to execute the critical task on a single processing entity in comparison to more than one processing entity.

19. The server computational device of claim 17, wherein the plurality of processing entities comprises a plurality of cores of a chip, wherein the local cache comprises an L1 and an L2 cache, and the shared cache comprises an L3 cache of the chip.

20. The server computational device of claim 17, wherein the plurality of processing entities comprises a plurality of virtual processors implemented via software or firmware.

* * * * *